United States Patent [19]

Takagi et al.

[11] Patent Number: 4,797,733
[45] Date of Patent: Jan. 10, 1989

[54] WHITE BALANCE ADJUSTING DEVICE FOR A COLOR VIDEO CAMERA

[75] Inventors: Yasushi Takagi; Toshio Murakami, both of Yokohama, Japan

[73] Assignee: Hitachi, Ltd., Tokyo, Japan

[21] Appl. No.: 129,978

[22] Filed: Dec. 8, 1987

[30] Foreign Application Priority Data

Dec. 12, 1986 [JP] Japan .................... 61-294808

[51] Int. Cl.$^4$ ............................. H04N 9/73
[52] U.S. Cl. .......................... 358/29; 358/41
[58] Field of Search ............ 358/29 K, 29, 41, 209

[56] References Cited

U.S. PATENT DOCUMENTS

| | | | |
|---|---|---|---|
| 4,219,841 | 8/1980 | Nishimura et al. | 358/29 C |
| 4,506,290 | 3/1985 | Hashimoto | 358/29 C |

FOREIGN PATENT DOCUMENTS

| | | | |
|---|---|---|---|
| 0116391 | 9/1981 | Japan | 358/29 C |
| 0066588 | 4/1985 | Japan | 358/29 C |
| 0186188 | 9/1985 | Japan | 358/29 C |

Primary Examiner—Howard W. Britton
Assistant Examiner—Victor R. Kostak
Attorney, Agent, or Firm—Antonelli, Terry & Wands

[57] ABSTRACT

A white balance adjusting device for a color video camera detects a color temperature detection signal R−B and a color information signal R+B−2Y from a video signal provided by the color video camera. A control signal generating means of the white balance adjusting device generates a control signal to drive a gate circuit when the level of the color information signal R+B−2Y is within a predetermined range of level. When the level of the color information signal is within the predetermined range of level, the gate circuit passes the color temperature detection signal R−B to apply the color detection signal R−B to a clipping circuit. The clipping circuit clips the amplitude of the color temperature detection signal R−B within a predetermined range of level. Chrominance signal gain control circuit for controlling the gains of chrominance signals R and B is controlled by the output of the clipping circuit for white balance adjustment.

10 Claims, 13 Drawing Sheets

R−Y

B−Y

R+B−2Y x = R−B

W Ye Cy G Mg R B x' = (R−B)' p q

W Ye Cy G Mg R B

WITHOUT CONTROL

CONTROLLED WITHOUT CLIPPING

CONTROLLED WITH CLIPPING

WHITE BALANCE ADJUSTING DEVICE FOR A COLOR VIDEO CAMERA

BACKGROUND OF THE INVENTION

The present invention relates to a white balance adjusting device for a color video camera and, more particularly, to a white balance adjusting device suitably applicable to a video camera which detects color temperature information from a picture signal and performs correcting operation continuously during taking pictures.

A white balance adjusting device which adjust the white balance by using video signals provided by a pickup element is disclosed, for example, in National Technical Report, Vol. 31, No. 1, pp.98-102, Feburary 1985. This known white balance adjusting device is based on a principle that the mean value of video signals is substantially equivalent to a video signal obtained by taking a white object under the same lighting condition when the angle of view is sufficiently large.

Japanese Patent Publication No. 53-2290 discloses a white balance adjusting system which adjusts the white balance of an image on the basis of a decision that a portion of the image represented by a luminance signal of high level, for example, 95% of a rated luminance or above, is white.

Although the accuracy of white balance adjustment of such a device and system is practically high enough, it is possible that errors are produced depending on the color of the object in taking a chromatic object.

Another white balance adjusting device decides, as stated in Japanese Patent Publication No. 53-2290, that a portion of an object represented by red, blue and green signals is white, if each signal level is above a predetermined level, and adjusts the white balance of the image on the basis of the signals representing the portion regarded as being white.

Such a conventional technique, however, processes signals for white balance adjustment on the basis of a decision that the image is white even if the image is not apparently "white", when the object has a high chroma, namely, when a single chromatic color is taken fully in a screen. Consequently, correct color temperature correction is impossible and erroneous white balance adjustment results. Another white balance adjusting method has been proposed to eliminate such an erroneous white balance adjustment. According to this white balance adjusting method, a white balance adjusting device becomes operative only when an object is really "white". That is, this white balance adjusting device decides that the object is "white" only when all the respective levels of three chrominance signals, namely, red, blue and green signals, are higher than a predetermined level, for example, 90% of a rated level. That is, in most signal conditions in which the respective levels of the three signals is higher than 90% of the rated level the object is regarded as being white. Thus, this white balance adjusting method can effectively eliminate the foregoing disadvantages. However, since the criterion of judgement for deciding that an object is white is severe, the white balance can accurately be corrected by intentionally taking a white board only in taking an object in a studio under an appropriate lighting condition, but such a criterion is met rarely under an ordinary taking condition.

Prior arts relating to the present invention are disclosed in Japanese Patent Provisional Publication (Kokai) Nos. 55-2524, 58-142693 and 59-189793, and U.S. patent application Ser. No. 937,394: "White Balance adjusting Device of Color Video Camera", Toshio Murakami, Yasushi Takagi, Hiroyasu Otsubo and Yutaka Sato.

SUMMARY OF THE INVENTION

Accordingly, it is an object of the present invention to provide a white balance adjusting device for a color video camera, capable of accurately correcting white balance under various taking conditions.

It is another object of the present invention to provide an automatic white balance adjusting device capable of continuously adjusting white balance during the taking operation of a video camera, and having improved response characteristics to respond to the panning operation and zooming operation of the associated camera.

To achieve the foregoing objects of the invention, the present invention generates a color temperature variation detection signal and a chromatic color discriminating signal, namely, a color information, on the basis of the output signal of a camera, and generates a white balance correction control signal for white balance adjustment from the color temperature variation detection signal only when the level of the chromatic color discriminating signal is below a predetermined level. The color temperature variation detection signal and the chromatic color discriminating signal can be obtained by producing, for example, an $R-B$ signal and $R+B-2Y$ signal from the output signals of the camera, namely, a luminance signal (hereinafter referred to "Y signal") and red and blue signals (hereinafter referred to as "R signal" and "B signal").

Thus, a white balance adjusting device according to the present invention comprises: a first detecting means for detecting the color temperature variation of illumination from a video signal provided by a signal processing system; a second detecting means for detecting a chromatic color discriminating signal representing the chromatic information of the illumination; a control signal generating means for deciding whether the level of the output signal of the second detecting means is within a predetermined range and provides a control signal on the basis of the decision; and a chrominance signal gain control means which is controlled by the output signal of the first detecting means and is controlled by the control signal only when the level of the output signal of the second detecting means is within a predetermined range.

When the color temperature of illumination is varied in taking a white object, the respective levels of the R signal and the B signal vary accordingly, whereas the levels of the green signal (hereinafter referred to as "G signal") or the $R+B$ signal remains substantially on a fixed level. Accordingly, the degree of deviation of the color of the object from white (coloration of white by the change of color temperature is regarded as white) can be determined from the detection of the variation of the level of the G signal, $R+B$ signal or the $R+B-2Y$ signal. Thus, the chromatic color discriminating signal is obtained by deciding whether the level of the G signal, R signal or the $R+B-2Y$ signal is within a predetermined range to extract only a signal variation resulting from the variation of the color temperature in a taking frame. Consequently, error in white balance correction which occurs in taking a chromatic object, namely, the possibility of unnecessary white balance adjustment due to the detection of a signal corresponding to the variation of the color temperature of an object, is reduced.

On the other hand, a color temperature variation signal such as an R−B signal or an R/B signal varies monotonously with the variation of color temperature of illumination, and is insensitive to coloration in green or magenta other than the variation of color temperature. Thus, the color temperature variation detection signal (R−B, R/B) is effective in detecting color temperature variation. The addition of the above-mentioned correction, namely, the extraction of only a signal in the vicinity of a locus of tone variation resulting from the variation of the color temperature of white, improves further the accuracy of color temperature information detection. However, it is difficult to discriminate colors, such as red and blue, in the vicinity of a locus of color temperature variation resulting from color temperature variation, even if the foregoing correction is executed. That is, it is difficult, in general, to find whether such colors are originally such colors and whether white is colored in such colors by the light of illumination having color temperatures corresponding to such colors (whether red chroma is further increased because red is illuminated by light of a low color temperature).

Under an ordinary taking condition, color temperature varies within a limited range and hence practically necessary values, such as detected variables and controlled variables, are decided naturally. For example, when a video signal indicates red, a controlled variable, at the maximum, canceling the variation of white due to color temperature variation is sufficient regardless of whether the original color is white or red. Accordingly, the dynamic range of a color temperature variation detection signal, for example, an R−B signal, for generating a control signal can be limited to a value corresponding to a range of color temperature variation in taking white, for example, 2500° K. to 10000° K., without any practical problem. Particularly, since excessive correction for a chromatic object having a high chroma can be suppressed, the deterioration of color reproduction is reduced.

DETAILED DESCRIPTION OF THE PREFERRED EMBODIMENTS

Figure 2:
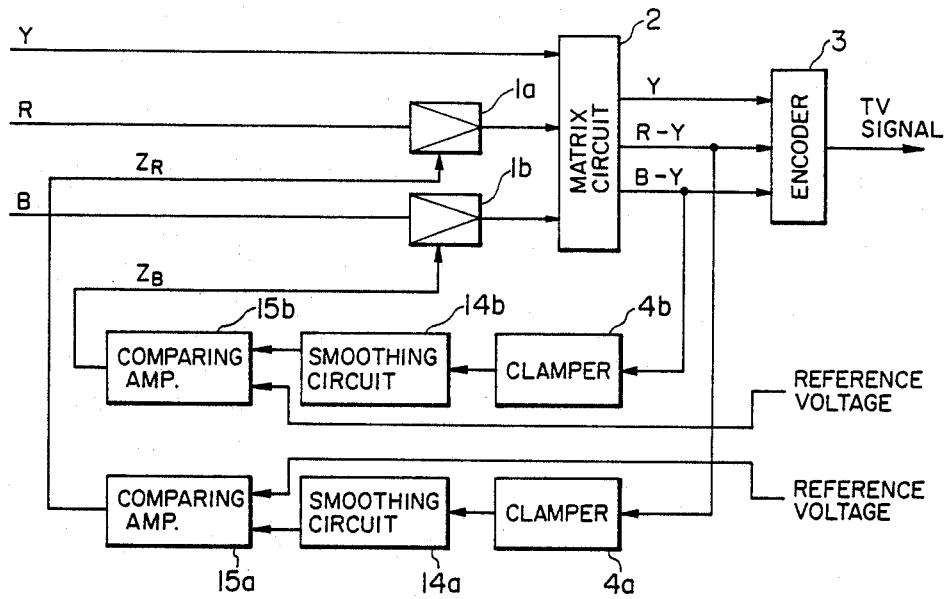
FIGS. 2 and 3 are block diagrams of conventional white balance adjusting devices.
Figure 3:
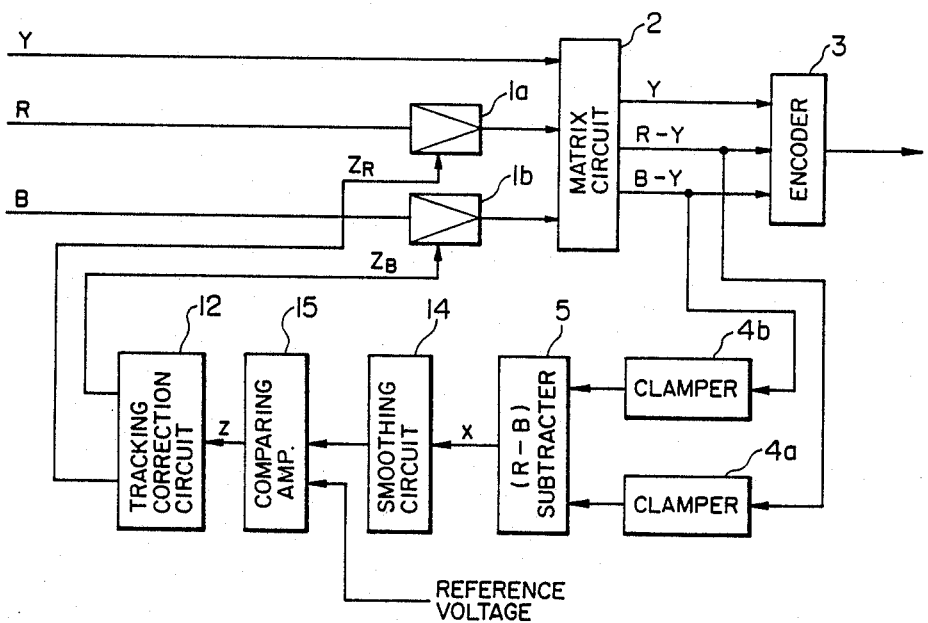

A conventional white balance adjusting device, on the basis of which the present invention has been made, will be described briefly prior to the description of the present invention. FIGS. 2 and 3 illustrate white balance adjusting devices which use video signals for automatic white balance correction. In either white balance adjusting device, $$R:B:G = 1:1:1 \tag{1}$$

when the video signals are in perfect white balance in taking an achromatic object. This white balance adjusting method is based on an empirical rule that the average signal representing the entire part of a picture is, in most cases, substantially equivalent to a signal obtained by taking an achromatic object even if the object is not an achromatic object.

The white balance adjusting device controls the respective gains of an R signal and a B signal by gain control circuits 1a and 1b so that color difference signals R−Y and B−Y are zero for white balance adjustment. Shown in FIG. 2 are a matrix circuit 2, an encoder 3, clamping circuits 4a and 4b, smoothing circuits 14a and 14b, comparing amplifiers 15a and 15b.

When white balace is adjusted by this method, the white balance is lost in various tones when the condition of the object is different from the empirical rule, namely, when a large area of a colored object is taken individually.

A white balance adjusting device of FIG. 3 incorporates improvements to obviate such an unsatisfactory white balance adjustment. In this white balance adjusting device, such a malfunction is obviated by generating an R−B signal by a subtracter 5, detects color temperature variation from the R−B signal, divides and corrects a single control signal Z by the R−B signal, and corrects the white balance adjustment by a tracking correction circuit 12 so that the white balance adjustment is effective only in the direction of the color temperature variation of the light source.

According to this method, the variation of the color condition of the picture from that meeting the empirical rule, for example, the variation of the general color condition of the picture toward green or magenta (G→R=B=0, Mg→R:B=1:1, $R-B$=0), and the control signal remains fixed and hence any adjustment to correct green or magenta to white is not executed, so that the possibility of the malfunction which is liable to occur in the white balance adjusting device of FIG. 2 is reduced remarkably. However, even the white balance adjusting device of FIG. 3 is not entirely free from malfunction and malfunction occurs depending on the hue of the chromatic color. For example, yellow signal (hereinafter referred to "Ye signal") includes a G component which is unaffected by color temperature variation and an $R-B$ component which corresponds to color temperature variation. Therefore the white balance adjusting device adjusts the white balance according to the contents of the $R-B$ component even though the same is insensitive to the variation of the G component.

Figure 4:
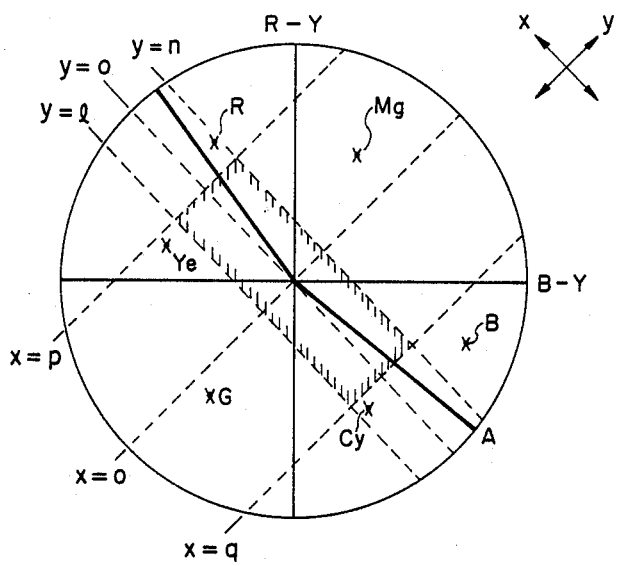
FIG. 4 is a vector diagram of a TV signal relating to the present invention.

A white balance adjusting device, in a first embodiment, according to the present invention will be described hereinafter. FIG. 4 is a color difference vector diagram showing a TV signal. Color reproducibility in taking a white object varies along a thick solid line A (a locus of color temperature variation of white) according to the color temperature variation of illumination. Suppose that a position in the vector diagram is represented by coordinates:

$$x=(R-Y)-(B-Y)=R-B \quad (2)$$

$$y=(R-Y)+(B-Y)=R+R-2Y \quad (3)$$

on a two-dimensional coordinate system. Then, the variation of the signal level with the variation of color temperature is represented by curves in FIG. 5. From FIGS. 4 and 5, it is found that the color temperature variation detection signal x is dependent uniquely on color temperature and is scarcely influenced by color variation along a direction perpendicular to the locus A of color temperature variation (approximately y=0). On the contrary, the chromatic color discriminating signal y is not influenced very much by color temperature and varies according to deviation from the locus A of color temperature variation. Suppose that a practical range of color temperature variation is, for example, 2500° K. to 10000° K., signals necessary for color temperature detection are those in the shaded area in FIG. 4. If only the signals in the shaded area can be obtained, errors in correcting white balance in taking objects of most chromatic color can be reduced. In FIG. 4, x=p and x=q correspond to color temperatures of 2500° K. and 10000° K., respectively, and, in general, color temperatures in the range of 2500° K. and 10000° K. may be taken into consideration in white balance adjustment.

Figure 1:
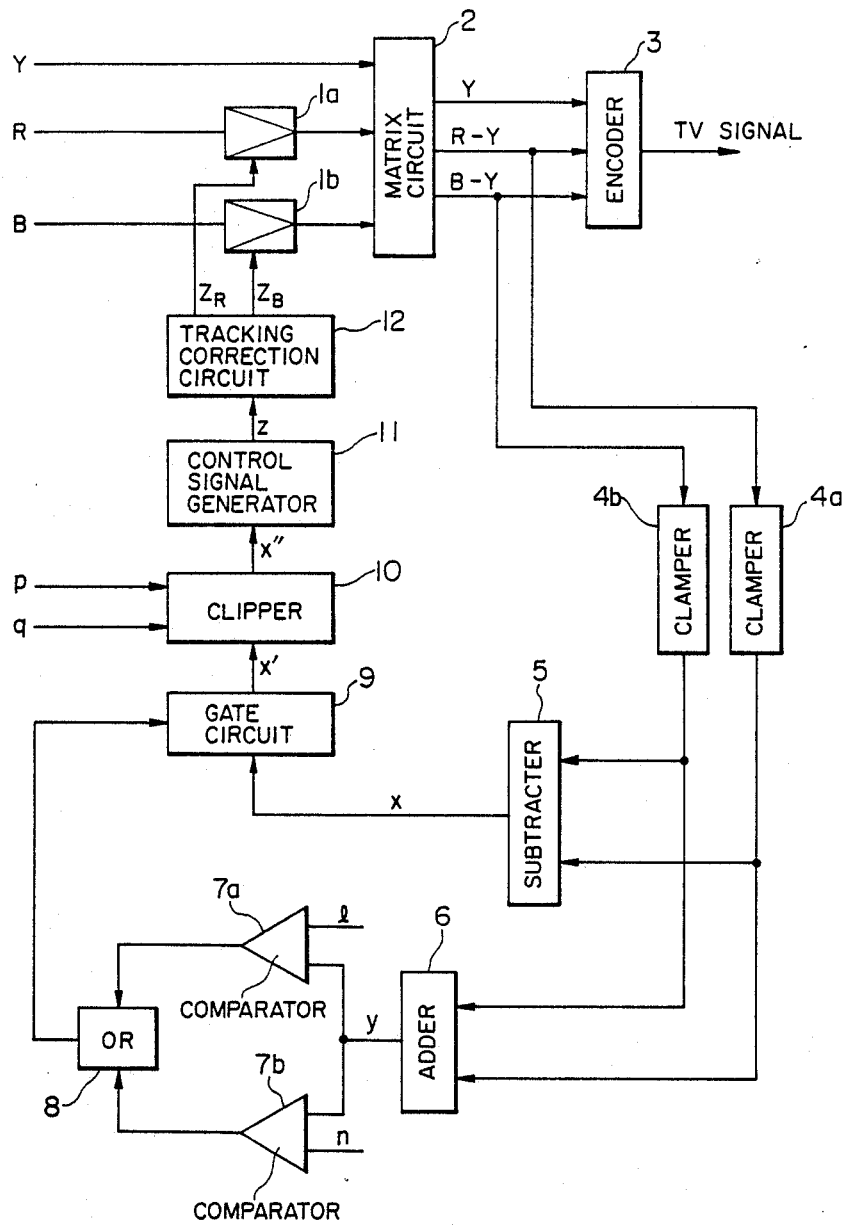
FIG. 1 is a block diagram of a white balance adjusting device, in a first embodiment, according to the present invention.

The white balance adjusting device in the first embodiment will be described with reference to FIG. 1. Parts shown in FIG. 1 corresponding to those shown in FIGS. 2 and 3 are denoted by the same reference numerals. In FIG. 1, there are shown an adder 6, comparators 7a and 7b, an OR circuit 8, a gate circuit 9, a clipper 10, and a control signal generator 11.

A luminance signal Y and chrominance signals R and B generated and processed by a pickup element are applied through gain control circuits 1a and 1b to a matrix circuit 2 to produce color difference signals $R-Y$ and $B-Y$. An encoder 3 encodes the luminance signal Y and the color difference signals $R-Y$ and $B-Y$ to provide a TV signal. Clampers 4a and 4b adjust the DC voltages of the color difference signals $R-Y$ and $B-Y$ provided by the matrix circuit 2, respectively. The clampers 4a and 4b may be omitted. The color difference signals $R-Y$ and $B-Y$ are processed by the adder 6 and the subtracter 5 to provide the two signals $x=R-B$ and $y=R+B-2Y$. The signals x and y can be selected properly by varying the ratio between the color difference signals $R-Y$ and $B-Y$ or by using the luminance signal Y.

The comparators 7a and 7b compares the signal y with reference signal levels, for example, DC voltages respectively corresponding to y=1 and y=n in FIG. 4. The outputs of the comparators 7a and 7b are applied to the OR circuit 8. The OR circuit 8 provides an output signal "1" (high level) when y is other than $1 \leq y \leq n$. The comparators 7a and 7b and the OR circuit 8 may be of any type provided that the operating characteristics thereof match those of the gate circuit 9. The signal x produced by the subtracter 5 is gated by the gate circuit 9 depending on the output of the OR circuit 8. In this embodiment, the signal x is cut off when the output of the OR circuit 8 is "1" (y<1 or y>n) and is passed when the output of the OR circuit 8 is "0" ($1 \leq y \leq n$).

Figure 6A:
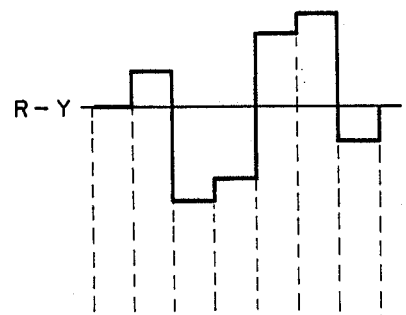
FIGS. 6A to 6F are charts showing the respective waveforms of signals processed by the white balance adjusting device of FIG. 1.
Figure 6B:
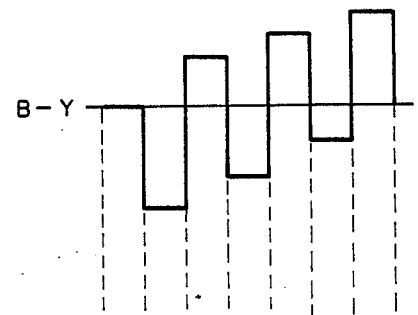
Figure 6C:
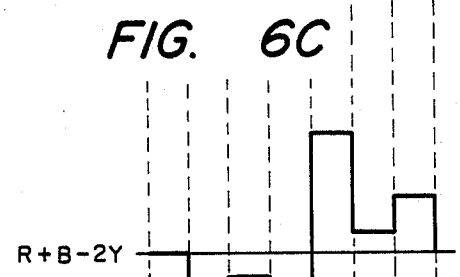
Figure 6D:
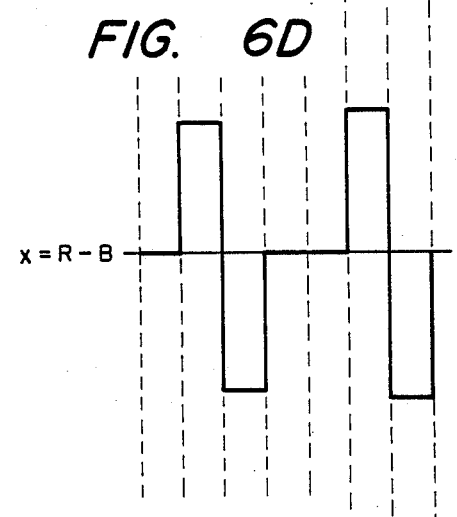
Figure 6E:
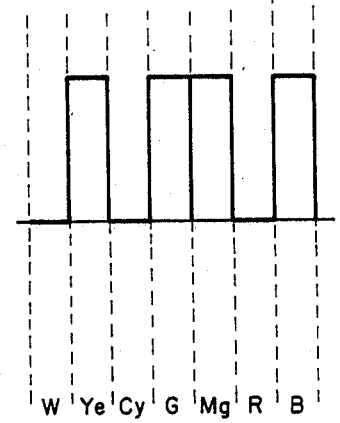
Figure 6F:
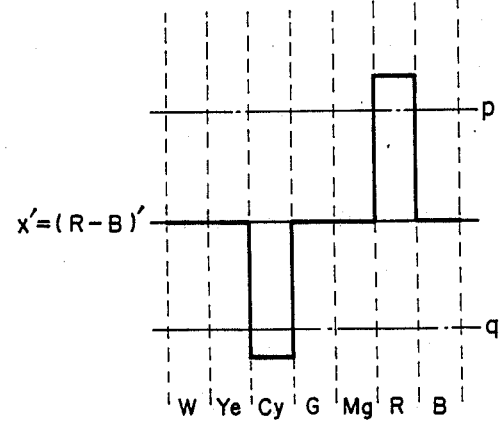

FIGS. 6A to 6F show the manner of operation of the first embodiment in taking a color bar chart (white, yellow, cyan, green, magenta, red and blue). FIGS. 6A and 6B show the color difference signals $R-Y$ and $B-Y$ provided by the signal processing system, respectively. FIG. 6C shows the signal y produced by the adder 6. FIG. 6D shows the signal x produced by the subtracter 5. FIG. 6E shows the output of the OR circuit 8, namely, a driving signal for driving the gate circuit 9. FIG. 6F shows the waveform of the output of the gate circuit 9. In this state, only signals R and Cy in a portion meeting the condition: $1 \leq y \leq n$ remain, while the rest of the signals are replaced with signals corresponding to the center of vector diagram, namely, a state in which white balance is established satisfactorily.

The dynamic range of the amplitude of the output signal x' of the gate circuit 9 is limited by the clipper 10. For example, when the upper limit of the dynamic range is x=p and the lower limit of the same is x=q, the amplitude of the output x' is limited to a value within the range of $q \leq x \leq P$. A fixed voltage is applied to the clipper 10 to decide the upper limit p and the lower limit q. Accordingly, the upper limit and the lower limit of the amplitude of the waveform of the signal x' are limited to p and q, respectively, as shown in FIG. 6F regardless of the further increase of the amplitude.

The output of the clipper 10, namely, a color temperature detection signal x", is applied to the control signal generator 11. Then, the control signal generator 11 generates a control signal z corresponding to a color temperature deviation (degree of lack of white balance) detected by the color temperature detection signal x". Although there is not any particulr restriction on the constitution of the control signal generator 11, the control signal generator 11 must be constituted so as to average the input color temperature detection signal x" over the entire area of the screen, to convert the color temperature detection signal x" into a corresponding DC potential, to compare the DC potential with a reference potential for the detection of degree of lack of white balance of the object, and to provide a voltage signal corresponding to the degree of lack of white balance, namely, the control signal z. A tracking correction circuit 12 divides and corrects the control signal z to provide control signals $z_R$ and $z_B$ for white balance adjustment along the locus of color temperature variation, and gives the control signals $z_R$ and $z_B$ to the gain control circuits 1a and 1b for the chrominance signals R and B, respectively. The control signal generator 11 and the tracking correction circuit 12 may be a conventional signal generator and a conventional tracking correction circuit, and hence the description thereof will be omitted.

Figure 7A:
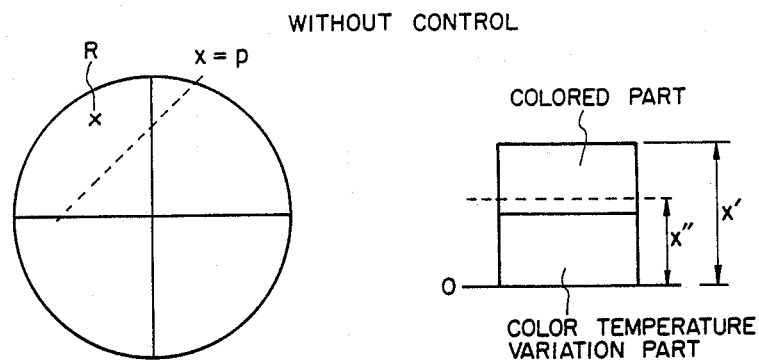
FIGS. 7A to 7C are vector diagrams of assistance in explaining the effects of the white balance adjusting device of FIG. 1.
Figure 7B:
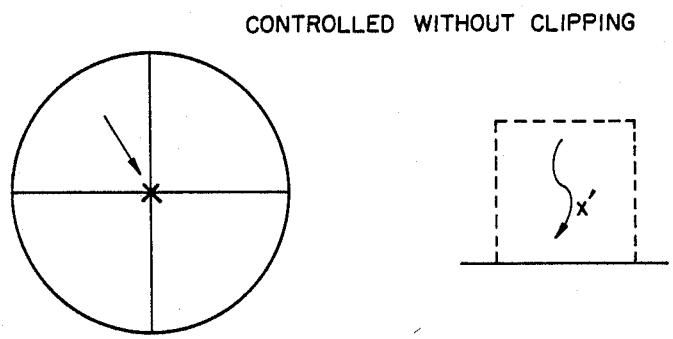
Figure 7C:
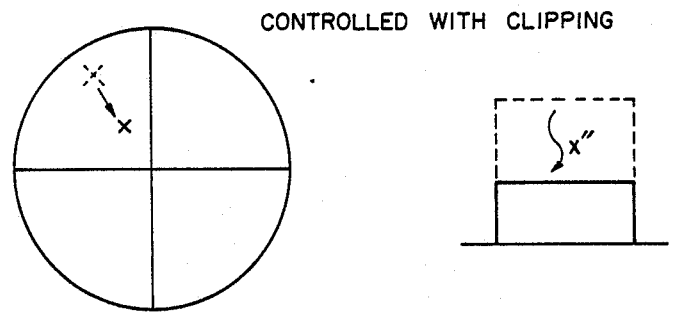

This embodiment uses the least signals necessary for color temperature detection for white balance adjustment. Therefore, this embodiment is able to achieve accurate white balance adjustment without being disturbed by the existence of a chromatic color such as yellow (Ye). FIGS. 7A to 7C illustrate the effect of the clipper 10 when a red object is taken at a low color temperature. FIG. 7A is a vector diagram when the first embodiment of the present invention is not applied. FIG. 7B is a vector diagram when the first embodiment of the present invention is applied except that the clipper 10 is omitted. FIG. 7C is a vector diagram when the first embodiment of the present invention is applied. As obvious from the comparison of FIGS. 7B and 7C, the saturation of the object is maintained without significant deterioration when the white balance adjusting device has the clipper 10.

Figure 8:
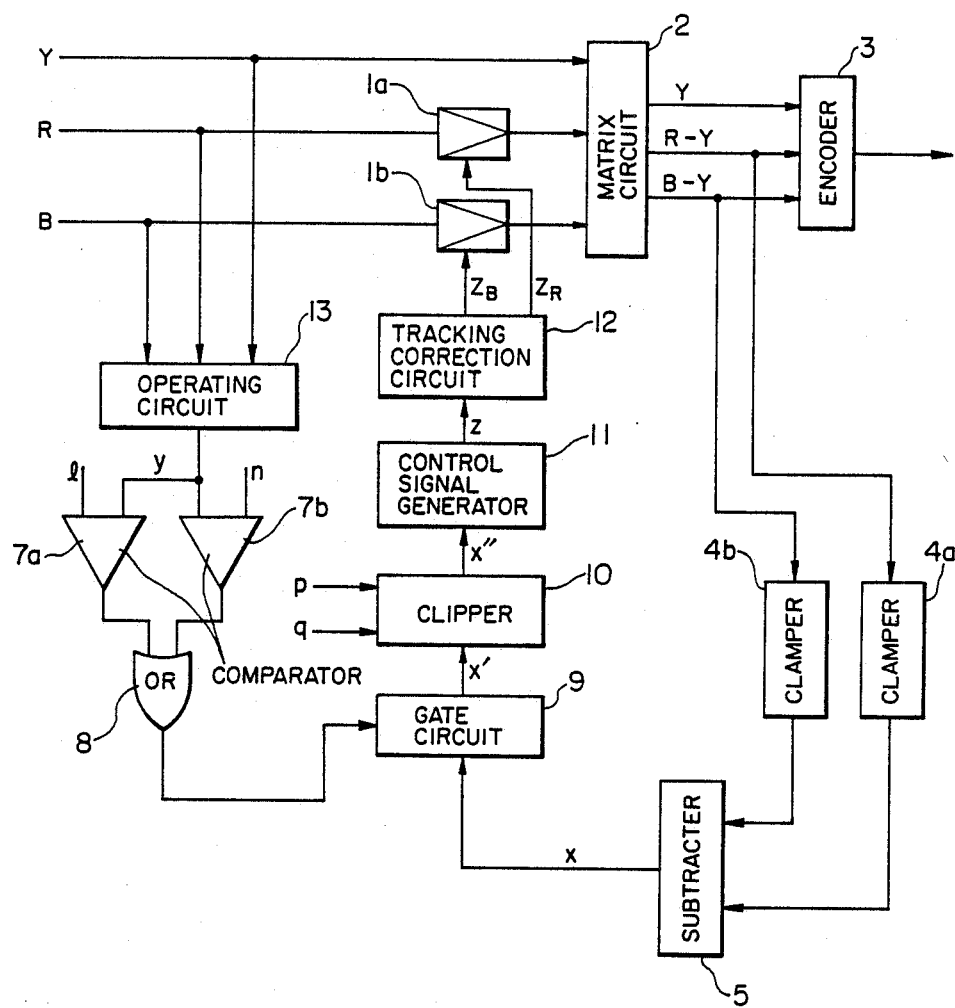
FIG. 8 is a block diagram of a white balance adjusting device, in a second embodiment, according to the present invention.

A white balance adjusting device, in a second embodiment, according to the present invention will be described hereinafter with reference to FIG. 8, in which parts previously described with reference to FIG. 1 are denoted by the same reference numerals. The second embodiment has an operating circuit 13. Lines for transmitting chrominance signals R and B are branched before gain control circuits 1a and 1b to apply the chrominance signals R and B directly to the operating circuit 13 for producing a signal y, namely, a signal R+B−2Y. In the second embodiment, the levels of the chrominance signals R and B are not caused to vary by the white balance adjusting operation, namely, the operation of the gain control circuits 1a and 1b, and hence the signal y representing the deviation of color from the color temperature variation locus can etably be obtained. The operation ratio is optional. A signal G−Y may be used instead of the signal R+B−2Y.

Figure 9:
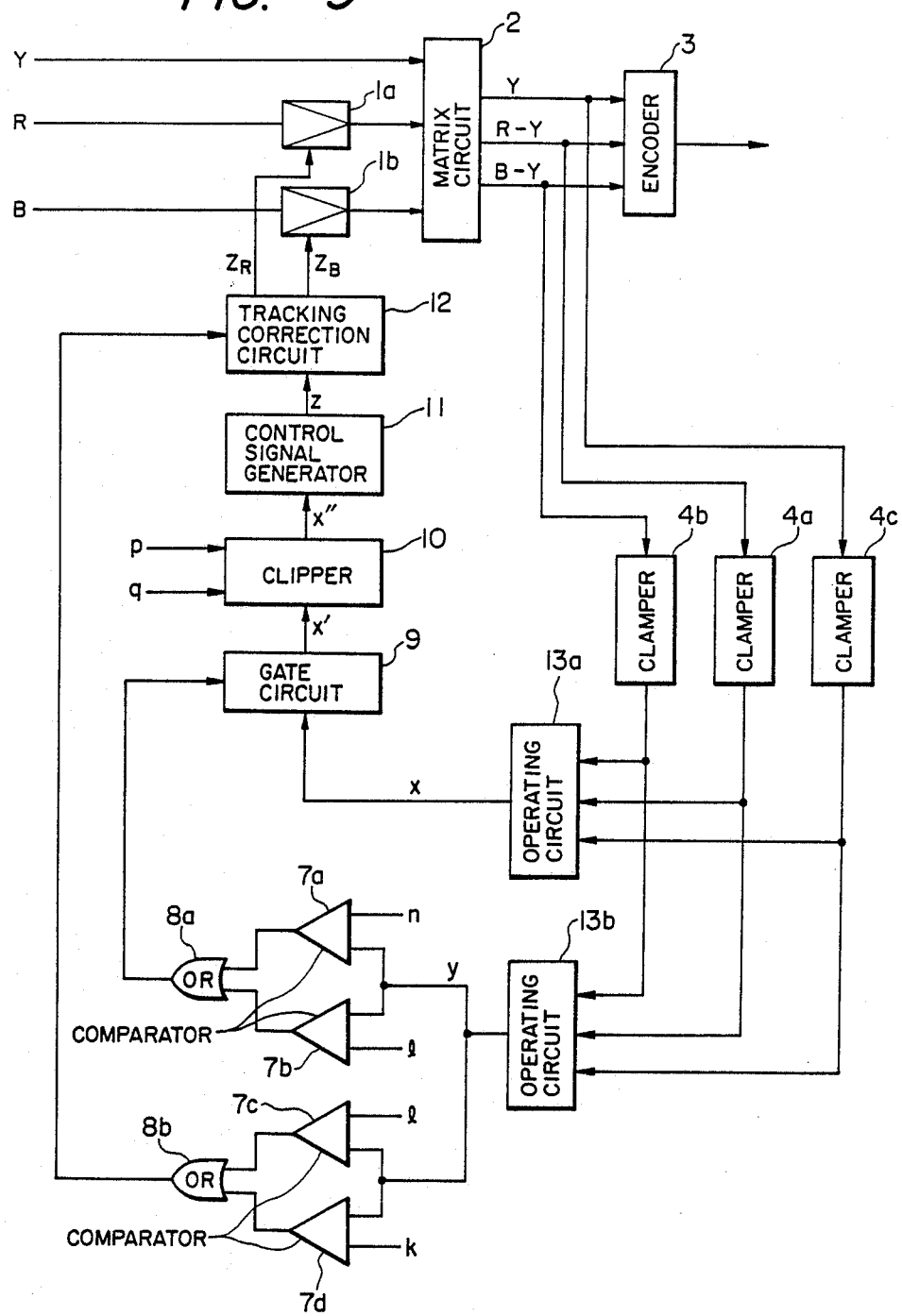
FIG. 9 is a block diagram of a white balance adjusting device, in a third embodiment, according to the present invention.

A white balance adjusting device, in a third embodiment, according to the present invention will be described hereinafter with reference to FIG. 9. Signals Y, R−Y and B−Y provided by a matrix circuit 2 are operated properly to determine the signals x and y optionally. Comparators 7c and 7d and an OR circuit 8b determines a second range of detection by using the signal y. The second range of detection is used, for example, when fluorescent lamps are used for lighting. Natural light such as sunlight has color quality conforming to the color temperature variation locus A. Most artificial light are not on the color temperature variation locus A; for example, the color quality of the light of a fluorescent lamp is biased to green.

In the third embodiment, a fluorescent lamp range: $k<y<l$ is provided outside the white range: $l<y<n$. When a decision is made that lighting condition corresponds to the fluorescent range, a tracking correction circuit is driven to give a bias toward magenta. That is, in taking a white object under the light of a fluorescent lamp, the tracking correction circuit is driven so that the control locus coincides with the zero point of the vector by shifting the gain control voltages $z_R$ and $z_B$ of channels R and B by a predetermined value. The control locus may be adjusted by controlling additional gain control circuits respectively connected in series to the gain control circuits 1a and 1b. This embodiment is effective for correcting the greening of the screen when fluorescent lamps are used for lighting. Although this embodiment is able to deal with special artificial lighting such as using mercury-arc lamps or sodium vapor lamps, this embodiment is particularly effective in a lighting condition using fluorescent lamps, which are used most frequently for lighting.

Figure 5:
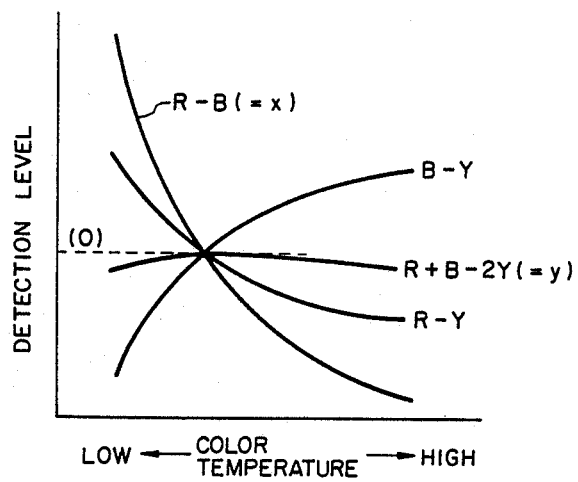
FIG. 5 is a graph showing the variation of video signals in detection level with color temperature.
Figure 10:
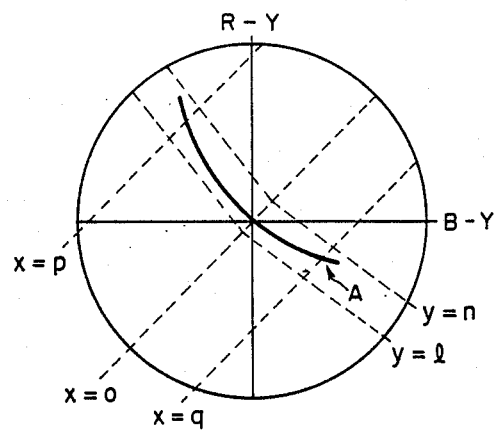
FIG. 10 is a vector diagram of TV signals relating to a white balance adjusting device, in a fourth embodiment, according to the present invention.
Figure 11:
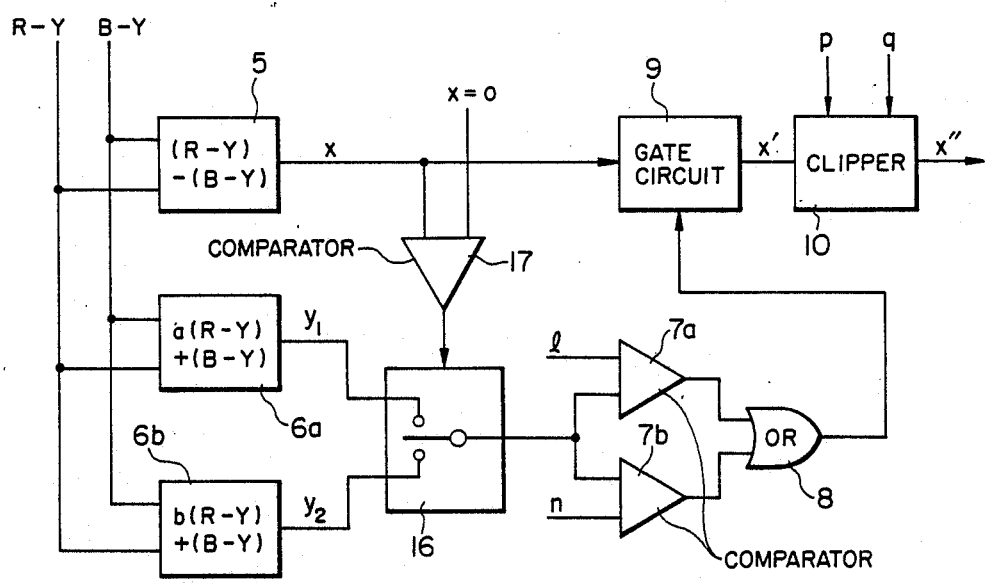
FIG. 11 is a block diagram of a white balance adjusting device, in a fourth embodiment, according to the present invention.

A white balance adjusting device, in a fourth embodiment, according to the present invention will be described hereinafter with reference to FIGS. 10 and 11. FIG. 10 is a vector diagram of a TV signal. As shown in FIGS. 10 and 5, the color temperature variation locus A, in general, is not straight in a plane R−Y, B−Y. As shown in FIG. 11, a plurality of color temperature variation detecting means as adders 6a and 6b are used to narrow an effective signal region ($p<x<q$, $l<y<n$) closer to the color temperature variation locus A. In this embodiment, y is varied for $x>0$ and for $x<0$.

$$x>0: y_1 = a(R-Y)+B-Y \qquad (4)$$

$$x<0: y_2 = b(R-Y)+B-Y \qquad (5)$$

where $a \neq b$. Thus a curved detection region as shown in FIG. 10 is defined.

FIG. 11 illustrates only an essential portion of the fourth embodiment and the rest of the circuits associated with that of FIG. 11 are the same as those of FIG. 1. In FIG. 11, indicated at 16 is a selecting circuit, and at 17 is a comparator. Two color difference signals R−Y and B−Y extracted from the signal processing system are applied to a subtracter 5, the adder 6a of an addition ratio of a:1, and the adder 6b of an addition ratio of b:1. The subtracter 5, the adders 6a and 6b provide detection signals x, $y_1$ and $y_2$, respectively. The detection signal x is applied to a gate circuit 9 and is processed in the same manner as in the first embodiment. The detection signal x is applied also to the comparator 17 and is compared with a reference value corresponding to x=0. The comparator provides a signal "1" (high level) when $x>0$ and provides a signal "0" (low level) when $x<0$. The output signal of the comparator 17 is used as a control signal for controlling the selecting circuit 16 such as a multiplexer. The selecting circuit 16 provides the signal $y_1$ or $y_2$ selectively; for eample, the signal $y_1$ when the control signal is "1", and the signal $y_2$ when the control signal is "0".

A pair of comparators 7a and 7b and OR circuit 8 decide whether or not the output signal of the selecting circuit 16, namely, the signal $y_1$ or $y_2$, is on a predetermined level. When the output signal of the selecting circuit 16 is not on the predetermined level, a gate circuit 9 is driven so as to cut out the color temperature variation detection signal x. The fourth embodiment uses the different chromatic color discriminating signals $y_1$ and $y_2$ respectively for ranges $x>0$ and $x<0$ to carry out non-linear white balance detection, and thereby a further accurate white balance detection can be achieved. Furthermore, the value of the color temperature variation detection signal x may be divided into smaller regions and more than two chromatic color discriminating signals y respectively corresponding to the regions of the color temperature variation detection signal x may be used.

Figure 12:
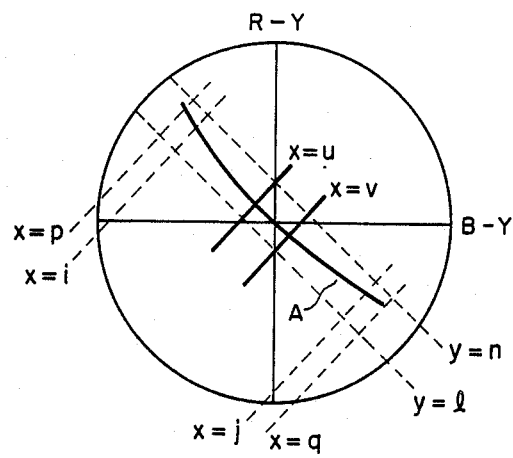
FIG. 12 is a vector diagram relating to a white balance adjusting device, in a fifth embodiment, according to the present invention.

A white balance adjusting device, in a fifth embodiment, according to the present invention will be described hereinafter with reference to FIGS. 12 through 20. The fifth embodiment stops the white balance adjusting operation when the color temperature variation signal x in is a narrow range around zero where perfect white balance is established to suppress further increase in the lightness of an image in taking a light-colored object. Such a white balance adjusting mode entails increase in the degree of insufficiency of white balance adjustment in taking a white object or an object which can be regarded as equivalent to a generally achromatic object. However, since a small degree of insufficiency of white balance adjustment around the reference point (x=0) is allowable while the achromatization of the image of a light colored object is a nuisance, the fifth embodiment is intended to improve visual effect by sacrificing the accuracy of white balance adjustment to some extent. The white balance adjusting operation near the reference point or near an optional point of color temperature can be stopped by making the color temperature variation detection signal x insensitive to color temperature variation in a fixed range of color temperature variation. For example, the value of the color temperature variation detection signal x is zero for the range u>x>v of color temperature variation (FIG. 12).

Figure 13:
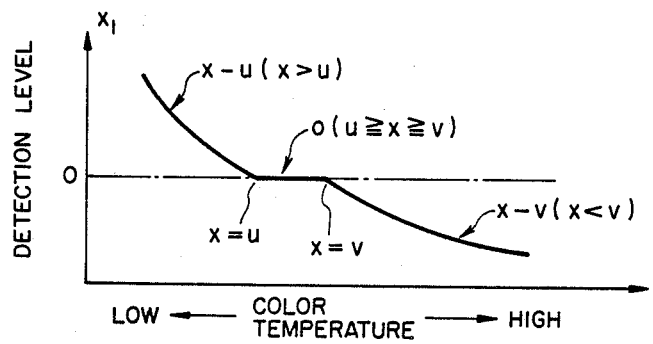
FIGS. 13 and 14 are graphs showing the variation of detection level with color temperature, and the variation of color tone with color temperature, respectively, in the operation of the white balance adjusting device, in a fifth embodiment, according to the present invention.
Figure 14:
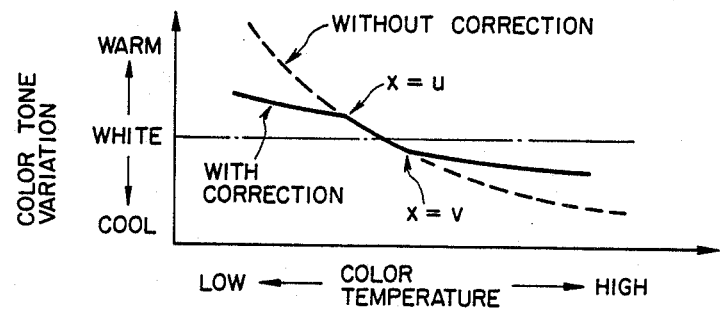

When the color temperature variation detection signal x having the characteristics shown in FIG. 5 is operated to provide a processed color temperature variation detection signal $x_1$ by using expressions:

$$x > u: x_1 = x - u \quad (6)$$

$$u \geq x \geq v: x_1 = 0 \quad (7)$$

$$x < v: x_1 = x - v \quad (8)$$

the processed color temperature variation detection signal $x_1$ has characteristics as shown in FIG. 13. As shown in FIG. 13, the white balance adjustment is stopped when $u \geq x \geq v$. The white balance adjustment is executed so that $x_1$ becomes zero ($x_1 \rightarrow u$) when $x > u$ and so that $x_1$ becomes zero ($x \rightarrow v$) when $x < v$. FIG. 14 shows the resultant white balance adjusting characteristics.

Figure 15:
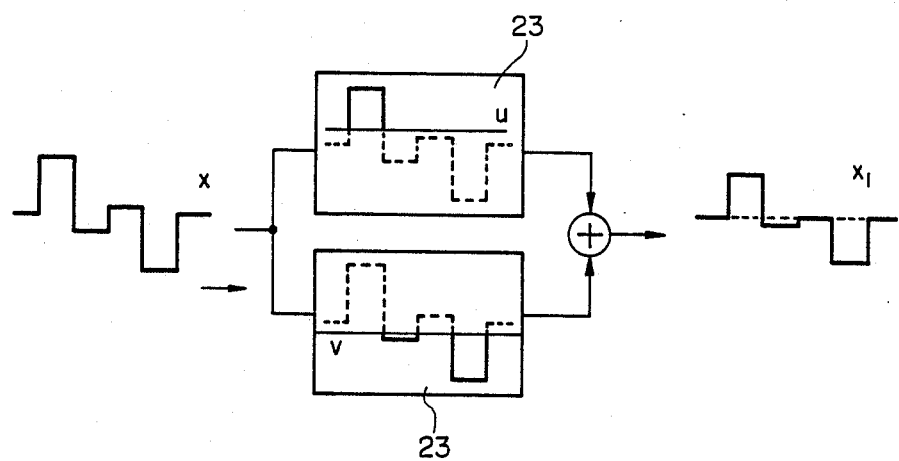
FIGS. 15 and 16 are diagrams showing an essential portion of the fifth embodiment of the present invention.
Figure 16:
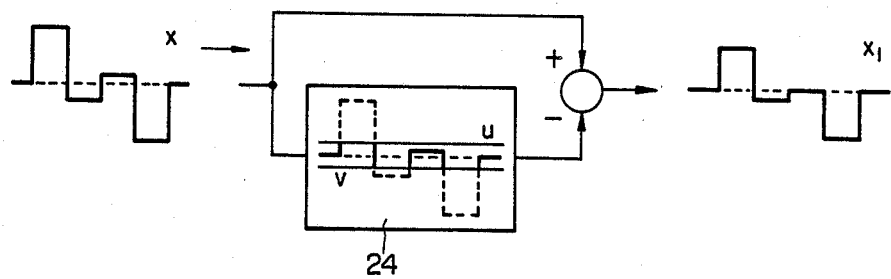

The white balance adjusting characteristics of FIG. 14 show the intensity of warm tone or cold tone on a monitor screen when the color temperature of light illuminating a white or achromatic object, in which the further the distance from an alternate long and short dash line (white), the higher the intensity of the tone. The intensity of the tone corresponds to the amplitude of the carrier chrominance signal of an NTSC signal and the distance of a point from the center of the color difference vector diagram of FIG. 12. Operation using expressions (6), (7) and (8) is carried out by using a pair of one-way clippers 23 (or diodes) as shown in FIG. 15 or a two-way clipper 24 (a clipper the same as the clipper 10 of FIG. 1) shown in FIG. 16. A circuit comprising the one-way clippers 23 or the two-way clipper 24 is inserted in the signal processing system at a position after the output of the color temperature variation detection signal x and before the input of the control signal generator (in FIG. 1, between the subtracter 5 and the gate circuit 9, between the gate circuit 9 and the clipper 10 or between the clipper 10 and the control signal generator 11).

Figure 17:
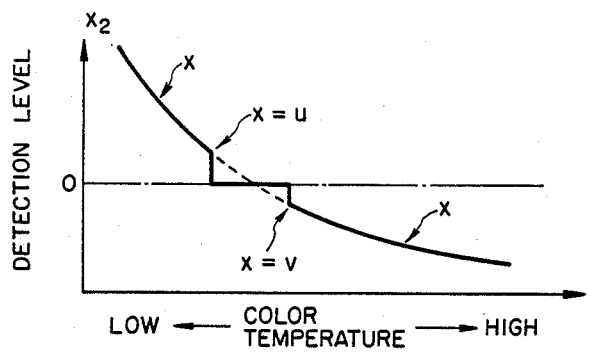
FIGS. 17, 18 and 19 are graphs showing the variation of detection level with color temperature, the variation of color tone with color temperature, and variation of detection level with color temperature, respectively, in the fifth embodiment of the present invention.
Figure 18:
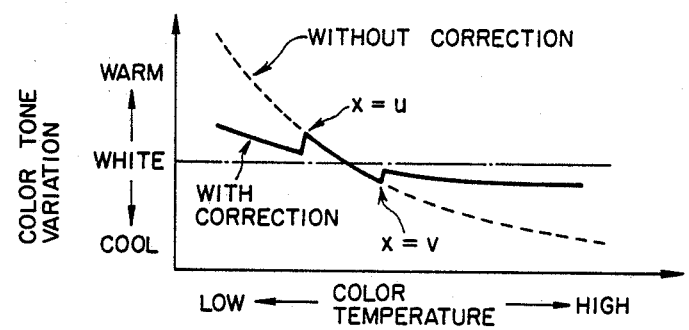
Figure 19:
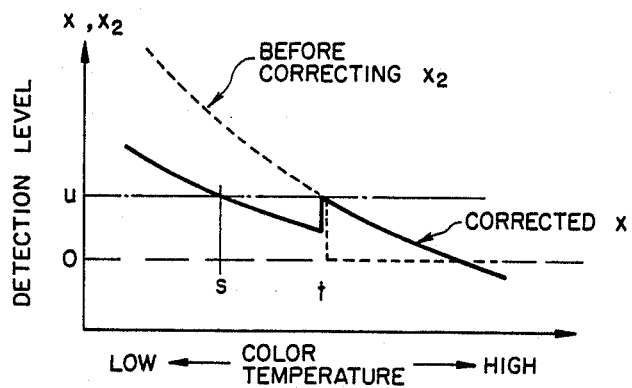

Another control process which can be executed by the fifth embodiment will be described hereinafter. In this control process, the color temperature variation detection signal x is subjected to conversion by using expressions:

$$x > u: x_2 = x \quad (9)$$

$$u \geq x \geq v: x_2 = 0 \quad (10)$$

$$x < v: x_2 = x \quad (11)$$

instead of expressions (6), (7) and (8). The color temperature variation detection signal x ($x_2$) is set for zero only when $u \geq x \geq v$ and the color temperature variation detection signal x is not changed under other conditions. FIG. 17 shows color temperature variation detection characteristics thus obtained. As obvious from FIG. 17, the white balance adjustment is stopped in a range $u \geq x \geq v$. The color temperature variation detection characteristics when $x > u$ and $x < v$ are the same as those of the first to fourth embodiments and hence white balance adjusting characteristics as shown in FIG. 18 are obtained for the entire region, which is different from those of FIG. 14. FIG. 19 shows the color temperature variation detection signal $x_2$ before adjustment and the color temperature variation signal x after the feed back control when the color temperature variation detection signal x is used for deciding the adjustment stopping range. In this state, a range in which the color temperature variation detection signal x is smaller than the threshold u and adjustment is stopped increases by a range corresponding to a range from a color temperature s to a color temperature t (or by a tone corresponding to such a range of color temperature). However, since the color temperature variation detection signal x is greater than the threshold u when the adjustment is stopped in the region s to t, the adjustment becomes effective after the next feedback control cycle, so that the control operation in the range s to t is unstable. However, since the control signal generator 11 of the feedback control system generates a control signal by integrating the color temperature variation detection signal x for a plurality of fields, generally noticeable oscillation does not occur and hence there is no practical problem. In such a case, however, the white balance adjustment characteristics are somewhat different from those shown in FIG. 18. To obtain the white balance adjustment characteristics as shown in FIG. 18, a feed-forward control mode is employed as in the second embodiment (FIG. 8) or a signal is given by an external means for the conversion of the color temperature variation detection signal x to $x_2$.

Figure 20:
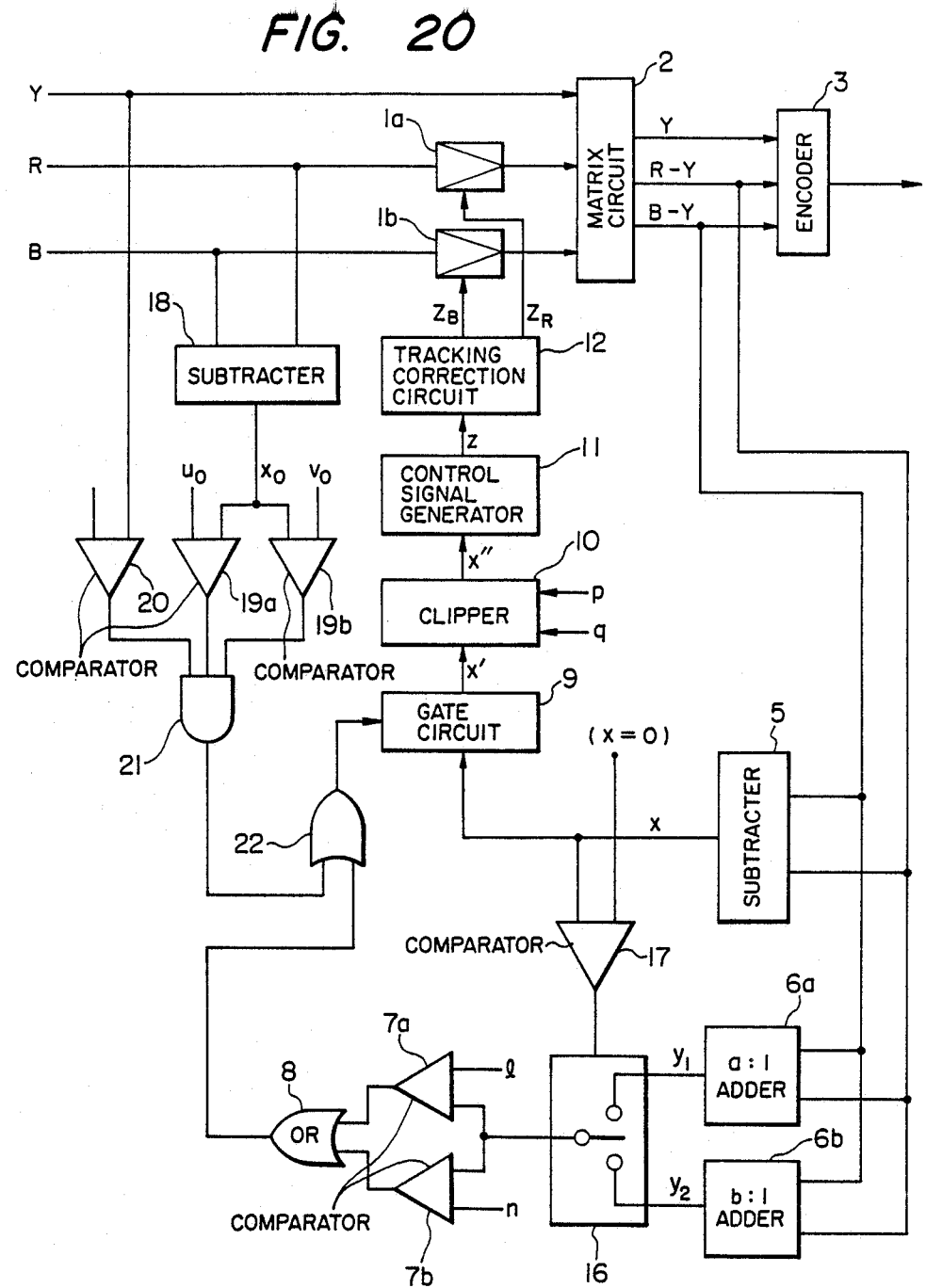
FIG. 20 is a block diagram of a circuit employed in the fifth embodiment of the present invention.

FIG. 20 shows a circuit, by way of example, for carrying out the second control method by the fifth embodiment. In FIG. 20, parts corresponding to those of the previously described embodiments are denoted by the same reference numerals. In FIG. 20 there are shown a subtracter 18, comparators 19a, 19b and 20, an AND circuit 21 and an OR circuit 22. The description of operation the same as that in the first and fourth embodiments will be omitted. The fifth embodiment incorporates additional means for stopping the white balance adjusting operation in a range $u \geq x \geq v$. Chrominance signals R and B are applied directly to the subtracter 18 to generate a signal $x_0$ ($=R-B$) before applying the same to gain control circuits 1a and 1b. The pair of comparators 19a and 19b compares the signal $x_0$ with values $u_0$ and $v_0$, respectively, to decide whether $u_0 \geq x \geq v_0$ (a range corresponding to $u \geq x \geq v$). A decision of the level of luminance Y by the comparator 20 may be added to the decision concerning $u_0 \geq x \geq v_0$. For example, when an achromatic color of irregular brightness (luminance) is displayed over the entire area of the screen, the signal $x_0$ varies continuously or intermittently between a plurality of values. If $u_0 \geq x_0 \geq v_0$ only in a dark portion, the degree of white balance adjustment decreases notwithstanding the color temperature being uniform and not requiring the stop of the white balance adjusting operation. Although not essential, such a faulty decrease in the degree of white balance adjustment can be suppressed by inhibiting the reduction of the signal $x_2$ to zero by the output of the comparator 20 when the level of the luminance signal is below a predetermined level (for example, 50%) even if $u_0 \geq x_0 \geq v_0$. A truth value meeting $u_0 \geq x_0 \geq v_0$ and $Y \geq 50\%$ obtained through the action of the comparators 19a and 19b and the AND circuit 21 is applied to the OR gate 22 together with the previous decision of white balance. Then, the OR circuit 22 provides a signal for driving the gate circuit 9. Thus, the signal components other than those near the color temperature variation locus A and the signal components within the range $u \geq x \geq v$ among those of the color temperature variation detection signal x are extracted, and thereby the white balance adjustment for white or achromatic objects is carried out according to the characteristics shown in FIG. 18.

A white balance adjusting device, in a sixth embodiment, according to the present invention will be described hereinafter with reference to FIGS. 12 and 21. In the first embodiment, the dynamic range of the color temperature variation detection signal x' provided by the gate circuit 9 is limited to the range $p \geq x \geq q$ of the variation of white balance in the practical color temperature range of approximately 2500° K. to 10000° K. Such a limitation is greatly effective for a color having a high chroma exceeding the clipping level (for example, x=p) and a color having an amplitude increased by color temperature variation and is not effective for a color of a medium chroma near the clipping level. Generally, the level of the luminance signal of such a color of a medium chroma is lower than that of white having the color temperature variation detection signal x of the same level. Some conventional white balance adjusting device uses the luminance signal for white detection. However, the level of the signal must be 90 to 95% of the rated level to detect "white" only by the luminance signal, which is not satisfactory in practical application. When the level of the color temperature variation detection signal is comparatively high (near the clipping level) and the level of the luminance signal is comparatively low (for example, when x>i or x<j in FIG. 12 and the level of the luminance signal is 50% of the rated level or below), the color is regarded as such a color having a medium chroma. Accordingly, errors in the white balance adjustment attributable to the chromatic color of such a medium chroma can be reduced by removing the signal components meeting the above-mentioned conditions by the gate circuit 9.

Figure 21:
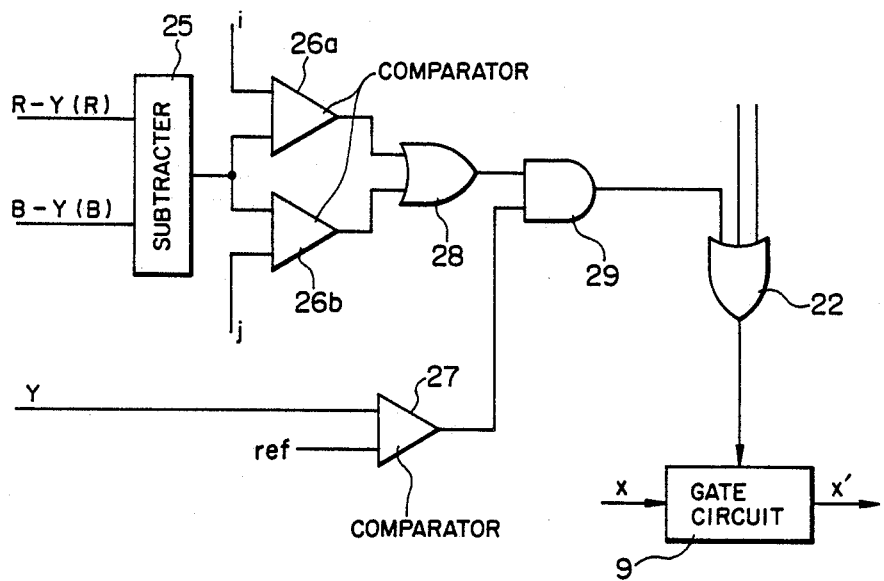
FIG. 21 is a block diagram of a white balance adjusting device, in a sixth embodiment, according to the present invention.

Referring to FIG. 21 showing the essential portion of the sixth embodiment, there are shown a subtracter 25, comparators 26a, 26b and 27, an OR circuit 28 and an AND circuit 29. A signal representing the difference between color difference signals R−Y and B−Y, which is equivalent to the color temperature variation detection signal x, is compared with thresholds i and j by the comparators 26a and 26b. When either x>i or x<j, the OR circuit 28 provides a signal "1" (high level). The comparator 27 compares the luminance signal with a predetermined threshold, for example, a value corresponding to a level as high as 50% of the rated level. When both the outputs of the comparator 27 and the OR circuit 28 are "1", namely, when chrominance signals representing a chromatic color of a medium chorma are received, the AND circuit 29 provides a signal "1". The output of the AND circuit 29 is combined with other signals such as the outputs of the OR circuit 8 and the AND circuit 21 shown in FIG. 20 by the OR circuit 22. Then, the OR circuit 22 provides a signal for driving the gate circuit 9 to gate the first detection signal. Chrominance signals R and B may be applied instead of the color difference signals R−Y and B−Y to the subtracter 25. When chrominance signals R and B are applied to the subtracter 25, the subtracter 25 provides a signal corresponding to the signal $x_0$. The thresholds i and j are changed if necessary. The sixth embodiment can easily be combined with the foregoing embodiments. When combined with the foregoing embodiments, and the color temperature variation detection signal x or $x_0$ provided by the foregoing embodiments is used, the subtracter 25 can be omitted. The sixth embodiment is effective for reducing errors in white balance adjustment for a chromatic color near the color temperature variation locus A, such as orange, represented by a chrominance signal which is difficult to extract by the first embodiment.

The present invention is capable of extracting only signals suitable for the detection of color temperature relating to the color temperature variation of the light source by means of an additional simple circuit, and is capable of suppressing excessive control on chromatic colors simulating color temperature variation. Thus, the present invention reduces errors in white balance adjustment in taking an object having a high chromatic color ratio and improves color reproduction.

What is claimed is:

1. A white balance adjusting device for a color video camera, comprising:
    a first detecting means for detecting color temperature variation on the basis of a video signal provided by the color video camera;
    a chrominance signal gain control means which is controlled for controlling the gain of chrominance signals by a detection signal provided by the first detecting means;
    a second detecting means for detecting color information from the video signal;
    a first output means which decides whether the level of the detection signal provided by the second detecting means is within a first range, and provides a first control signal; and
    a control execution means which enables the control of the chrominance signal gain control means by the detection signal provided in accordance with the first detecting means by the first control signal, when the level of the detection signal provided by the second detecting means is in the first range.

2. A white balance adjusting device according to claim 1, wherein said first output means comprises a pair of comparing means for deciding whether the detection signal provided by said second detecting means is within said first range, and logic circuit means for producing said first control signal by processing the outputs of said pair of comparing means.

3. A white balance adjusting device according to claim 2, wherein said first detecting means includes a limiting means for limiting the effective range of detection of color temperature variation.

4. A white balance adjusting device according to claim 3, wherein said limiting means is a clipping circuit which limits the amplitude of said detection signal within a predetermined range of level.

5. A white balance adjusting means according to claim 1, wherein said first detection signal is an $R-B$ signal, where R is a red signal and B is a blue signal.

6. A white balance adjusting device according to claim 1, wherein said second detection signal is an $R+B-2Y$ signal, where Y is a luminance signal.

7. A white balance adjusting device according to claim 1, wherein said second detecting means comprises a plurality of color information generating means for generating color information corresponding to the level of the detection signal provided by said first detecting means, and selecting means for selecting the outputs of the color information generating means.

8. A white balance adjusting device according to claim 7, wherein said color information generating means are two adding means differing from each other in addition ratio, respectively for receiving the two pieces of color information produced on the basis of said video signal.

9. A white balance adjusting device according to claim 1, further comprising:
a second output means which decides whether the level of the detection signal provided by said second detecting means is within a second range of level, and provides a second control signal; and
a control mode varying means for varying the mode of control operation of said control execution means according to said second control signal.

10. A white balance adjusting device for a color video camera, comprising:
a first detecting means which detects the variation of the color temperature of a lighting source on the basis of a video signal provided by the color video camera and provides a color temperature variation signal;
a second detecting means which detects color information from the video signal and generates a chromatic color discriminating signal;
a control signal generating means which decides whether the level of the chromatic color discriminating signal provided by the second detecting means is within a predetermined range of level, and generates a control signal;
a gate means which gates the output of said first detecting means according to the control signal provided by the control signal generating means;
an amplitude limiting means for limiting the amplitude of the output of the gate means below a predetermined amplitude; and
a gain control means which controls the gains of the chrominance signals of the video signal according to the output of the amplitude limiting means.

* * * * *